April 10, 1951   C. W. CHILLSON   2,548,195
HYDRAULIC COUPLING

Filed Sept. 28, 1946   3 Sheets-Sheet 1

INVENTOR.
Charles W. Chillson
BY
J. P. Keiper
ATTORNEY

April 10, 1951

C. W. CHILLSON 2,548,195

HYDRAULIC COUPLING

Filed Sept. 28, 1946

INVENTOR.
Charles W. Chillson
BY
*F. P. Keiper*
ATTORNEY

INVENTOR.
Charles W. Chillson
BY
ATTORNEY

Patented Apr. 10, 1951

2,548,195

UNITED STATES PATENT OFFICE 2,548,195

HYDRAULIC COUPLING

Charles W. Chillson, Caldwell, N. J., assignor to Curtiss-Wright Corporation, a corporation of Delaware Application September 28, 1946, Serial No. 699,996

2 Claims. (Cl. 74—413)

This invention relates to hydraulic couplings, and more particularly to a shaft coupling adapted to absorb or minimize torsional shocks and vibrations, and to damp or eliminate resonant responses which may result from such vibrations. One application of the invention is in the generation of pure sine wave alternating current signal frequencies from the drive shaft of a multi-cylinder internal combustion engine wherein the successive power impulses create torsional vibrations which would give rise to high frequency harmonics except for the damping action of the coupling between the engine and generating device.

It is accordingly an object of the invention to provide a coupling device for transmitting a force or moment, and for eliminating or absorbing and damping vibrations and shocks existent in the moving force.

Another object of the invention is to provide in a coupling device, a damping means, the damping effect of which varies with the variations in applied force being transmitted.

A further object of the invention is to provide in a coupling device a hydraulic fluid pressure source supplying a variable volume hydraulic pressure chamber adapted for the transmission of force through the coupling, and in which variations in driving force are damped in varying degree as the chamber volume varies.

Still another object of the invention is to provide a rotary coupling device for the purposes set forth, of a rugged simple and light weight construction requiring a minimum of space.

The above and many other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference characters indicate like parts:

Figure 1:
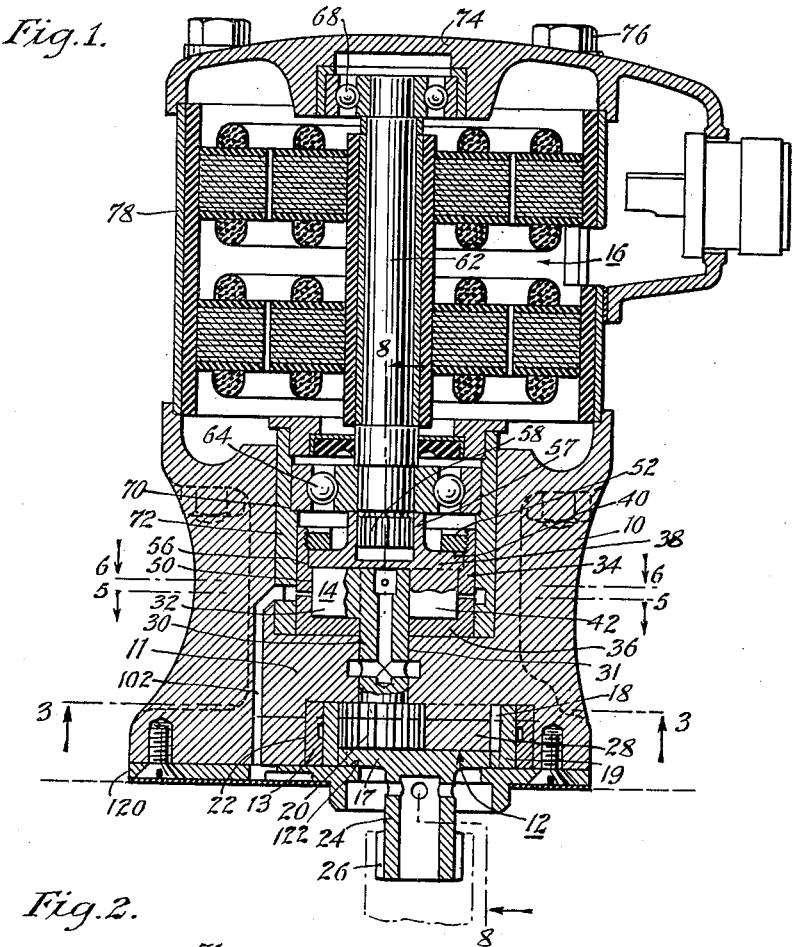
Figure 1 is a longitudinal section through the hydraulic coupling and an alternator driven thereby.
Figure 2:
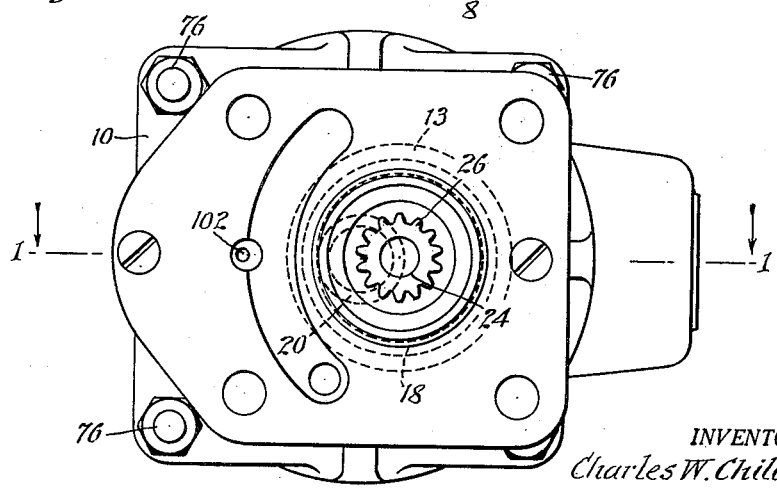
Figure 2 is a bottom plan view of the coupling.

Referring to the drawings and more particularly Figure 1, there is shown a substantially circular casing 10 having positioned in the base thereof a gear pump generally indicated at 12 and a hydraulic coupling driven through the gear pump generally indicated at 14. Drivably connected to the hydraulic coupling 14 and positioned coaxially thereabove is an alternator generally indicated as at 16. It will be understood that the gear pump and hydraulic coupling are adapted to deliver a smooth torque output when driven by a source of power of a pulsating type such as a multicylinder internal combustion engine. The desirability of driving the alternator through the coupling at a uniform speed free from pulsations of the prime mover will readily appear, since the voltage generated by the alternator should be free of undesirable fluctuations or harmonics.

Figure 3:
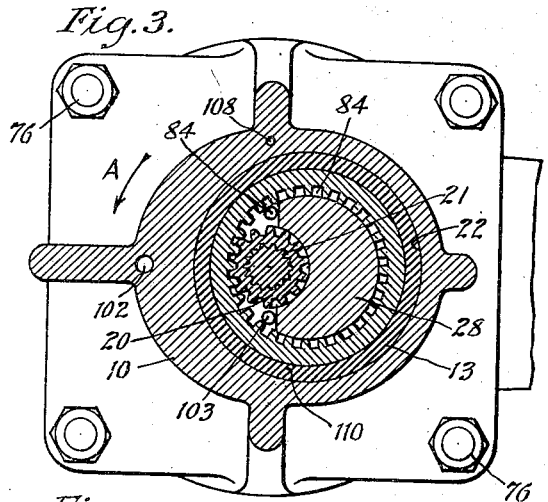
Figure 3 is a transverse section looking upwardly and taken substantially on the line 3—3 of Figure 1.
Figure 4:
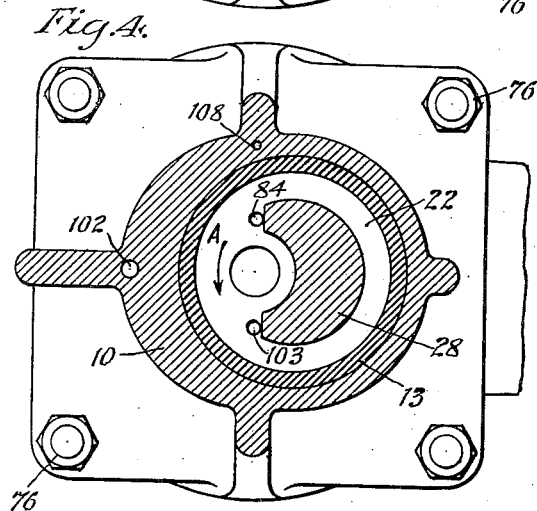
Figure 4 is a transverse section looking upwardly and taken substantially on the line 3—3 of Figure 1, with the pump and drive gears removed.
Figure 7:
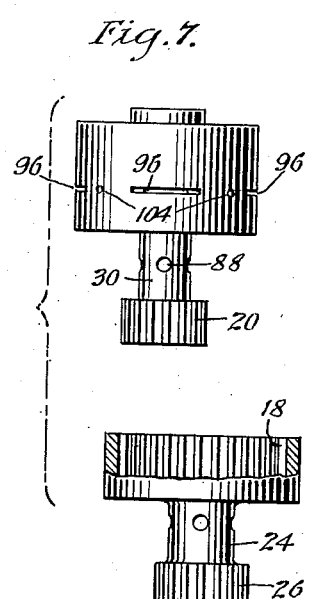
Figure 7 is an elevational view of the driving and driven elements of the pump and the vane type expansible fluid chamber.

The gear pump comprises an internal driving gear 18, and an intermeshing driven pinion 20, the internal gear travelling in an annular groove 22 in the underface of the casing 10 and being driven from a depending stub shaft 24 having a driving spline 26. The external teeth of the pinion 20 and the internal teeth of the gear 18 are closely bounded by a lunar shaped island 28 formed integral with the casing 10 and forming with the sleeve ring 13, the annular channel 22, thus providing the necessary passages for pump operation through the intermeshing of the gears 18 and 20. Fluid under pressure is delivered from the pump into outlet 84, and received from inlet 103 when the gears rotate in the direction of arrow A in Figures 3 and 4. The internal gear may be formed from a head portion 17 splined into one edge of the internally toothed ring 19.

Figure 6:
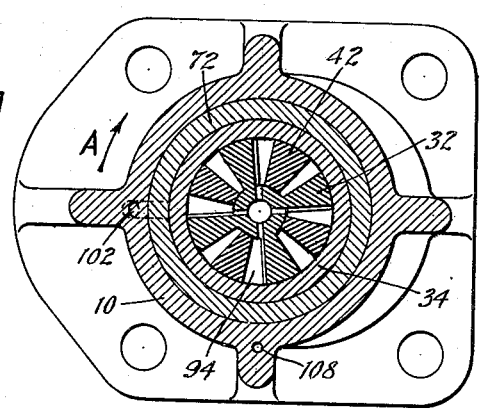
Figure 6 is a transverse section looking downwardly and taken substantially on the line 6—6 of Figure 1 through the vane type expansible fluid chamber, showing the inlets thereto.
Figure 5:
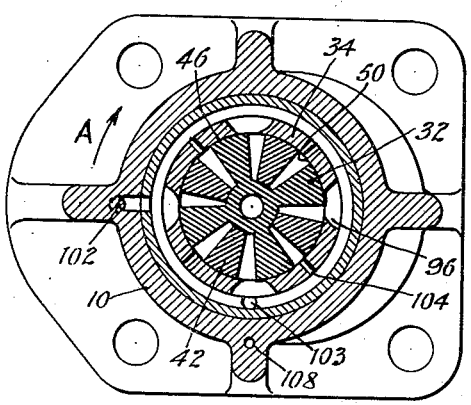
Figure 5 is a transverse section looking downwardly and taken substantially on the line 5—5 through the vane type variable volume fluid chamber showing the exhaust ports therefrom.

The pinion 20 is suitably secured as by splines 21 to an upwardly extending shaft 30 journalled in the transverse central wall 11 of the casing 10. Affixed to the shaft 30 are a plurality of rectangular radial wedge sectioned vanes 32 (see Figures 5 and 6) rotatably located within a surrounding cylindrical cup member 34 having a flat bottom wall 36 through which the shaft 30 passes. Inserted within the rim of the cup 34 from the upper side thereof is a closure member 38 having a disc or flange 40 adapted to fit within the rim of the cup 34, the flange being seated in an annular shoulder 56 lying in the plane of the upper surface of the vanes 32. The flange 40 is provided with depending radial rectangular wedge sectioned vanes 42, adapted to be interposed between the vanes 32 carried by the shaft 30. The vanes 32 and 42 are relatively rotatable with respect to each other through an angle less than 90° dependent upon the combined arcuate thickness of vane 42 and vane 42. The facing walls of the vanes 32 and 42 preferably are constituted by radial axial plane surfaces. The vanes 42 slidingly bear against the arcuate faces 48 of the cylindrical walls 46 of the shaft 30 between the vanes 32, and the outer arcuate face of the vanes 32 slidingly bear against the internal cylindrical bore 50 of the cup 34. It will be understood, however, that the vanes 32 are freely angularly displaceable with respect to the vanes 42 and the sliding engagement referred to is merely sufficient to prevent leakage while at the same time permitting free relative angular movement between the parts. The cup 34 and the vanes 42 supported from the flange 40 of the member 38 are held rigidly together by means of an annular exteriorly threaded nut 52 in the cup rim adapted to hold the periphery of the flange 40 seated upon the internal shoulder 56 of the rim of cup 34, and the vanes 42 projecting from the flange 40 abutting the bottom wall 36 of the cup 34.

The member 38 is provided with an internally splined socket 57 adapted to receive the externally splined end 58 of an alternator shaft 62, journalled in spaced bearings 64 and 68, the former being received within an annular shouldered recess 70 of bushing sleeve 72, within which the cup 34 is adapted to rotate. The bearing 68 is positioned in the top casing member 74, secured to the casing 10 by means of bolts 76, the casing member 74 being spaced from the casing 10 by an alternator housing sleeve 78.

Figure 8:
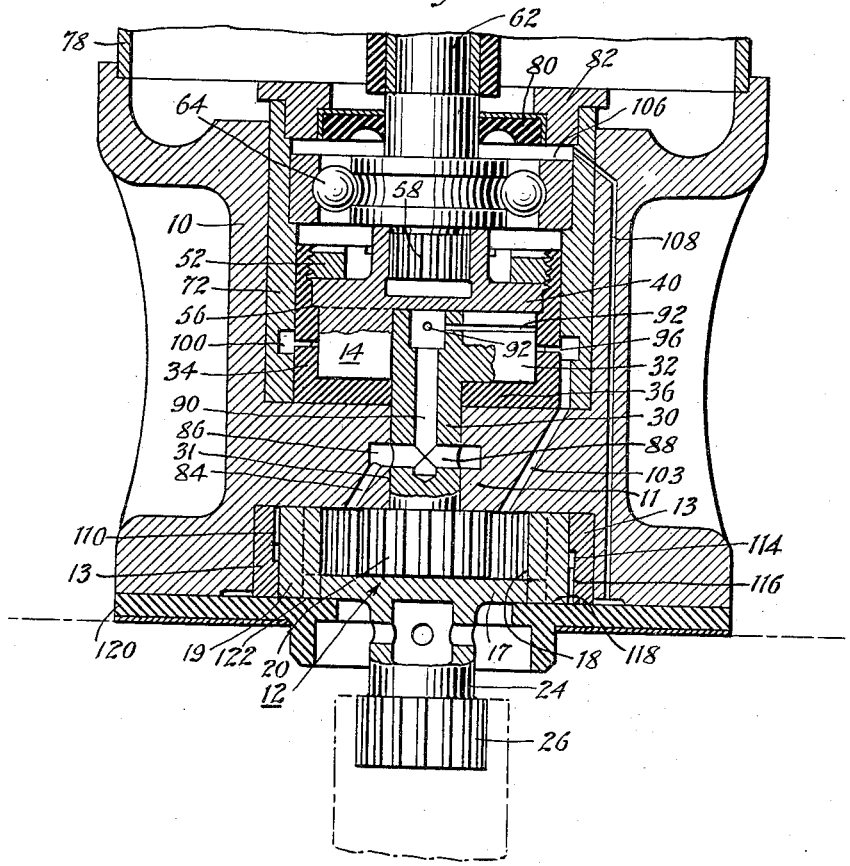
Figure 8 is an enlarged sectional view of the longitudinal hydraulic drive taken substantially on the line 8—8 of Figure 1.
Figure 9:
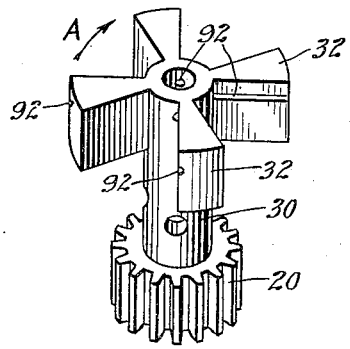
Figure 9 is a perspective view of the vane driving element and the pump driven gear of the coupling.

Referring to Figure 8 it will be observed that fluid delivered from the gear pump 12 is conducted through a pump discharge port 84 into an annular channel 86 in the bearing 31 in wall 11 through which the shaft 30 passes. The shaft in turn is provided with radial inlet ports 88 aligned with the annular channel 86, and connecting with an axial port 90 extending upwardly to a point in the region of the vanes 32 from whence radial ports 92 extend, one for each vane 32. The radial ports 92 lie substantially in the forward or driving face or plane of the vanes 32, it being understood that the shaft 30 and vanes 32 rotate in a clockwise direction as indicated by the arrows A in Figures 5 and 6.

The gear pump thus supplies the expansible chambers 94 with fluid under pressure at a certain rate depending upon the capacity of the pump, which, it will be understood, may be chosen to suit the necessary requirements. The fluid entrapped in the chambers 94 is permitted to escape therefrom radially outward through circumferentially extending slits 96 in the drum 34 from whence the fluid flows into an annular receiving groove 100 in the sleeve bushing 72 to which is connected a passage 102 connected with a source of fluid under relatively low pressure. The annular receiving groove 100 is also connected by a conduit 103 forming at its other end the intake port of the gear pump 12.

The slits 96 are arranged in the path of travel of the vanes 32 so that the circumferential length of the slits is in effect varied by the angular relation between the driving vanes 32 and the driven vanes 42 and the cross section of the slits 96 is accordingly varied as the volume of the expansible chambers decreases or increases and as the vanes 32 and 42 approach and recede from one another. By selecting a proper axial width for the slits 96, taking into account the volume of the chambers 94, the torque to be transmitted thereby and the fluid output of the gear pump 12, the driving vanes 32 may be angularly spaced with respect to the driven vanes 42 a distance depending upon the driving torque applied to the vanes 32 and the resistance to rotation of the driven vanes 42, it being appreciated that with a sudden increase in driving torque, the pressure increase within the expansible chambers will tend to discharge a greater quantity of fluid through the slits 96 thereby tending to shorten the effective length thereof, through the covering movement of the vanes 32 in rotating relative to the drum 34. Thus pulsations in the driving torque are damped by variation of the orifice and fluid pressure resulting from the pulsations. Violent pulsations of the driving member are suppressed through variations in the pressure of the hydraulic fluid and by the relative movement between the driving and driven vanes so that those pulsations existing in the driven vanes and member are minor in character. The amount of damping or suppression of driven member pulsation is controlled by the width of the discharge slits 96 which, in effect, provides a regulation for the permissive torque in the system and the permissive variation in angular displacement between the driving and driven vanes. It is believed to be clear, particularly in Fig. 5, that the vanes 32 of the driving member move across the slits 96 to vary the effective area of the discharge orifices defined between the slits and the leading edges of the vanes 32.

In order to prevent fluid which may leak behind the vanes 32 from interfering with the normal operation of the hydraulic drive as heretofore set forth, the drum 34 is provided with radial relief ports 104 aligned with the groove 100 which permit fluid entrapped behind the vanes 32 to escape into the discharge annulus 100 previously described. In order to permit the escape of excess fluid which may reach the compartment 106 within which the bearing 64 is positioned, a port 108 is provided extending from a point immediately below a protective seal 80 carried in bushing 82, to the base of the casing 10. Leakage over the upper face of the annular gear 18 of the gear pump is permitted to flow downwardly in a groove 110 arranged in the sleeve bushing 13, and thence into an annular groove 114 from whence such fluid is permitted to escape through a groove 116 downwardly to the upper face 118 of the end plate 120 upon which the end face 122 of the internal gear 18 bears. It will thus appear that by employing a lubricating oil for the hydraulic coupling, all parts of the coupling with the exception of the upper alternator bearing are lubricated either directly or indirectly by such fluid.

By varying the effective shape of the discharge port 96, the relationship of piston vane displacement to torque transmitted can be varied in any manner desired. Any resonant relationship existing between the load and the driving source can then only exist at one relative location of the vane. If the coupling attempts to transmit excitations of an appreciable magnitude, the size of the discharge port 96 will be changed, thereby destroying any chance matching of excitation frequency and a discharge port opening of the size necessary for resonance. In other words, since the resonant frequency of the coupling depends upon the discharge opening size, so long as there is considerable oscillation between the driving and driven vanes the discharge opening is constantly varying and, therefore, incapable of resonating at any particular frequency of the driving source.

Though a single embodiment of the invention has been illustrated and described, it is to be understood that the invention is not limited thereto. As various changes may be made without departing from the spirit of the invention, as will be apparent to those skilled in the art, reference will be had to the appended claims for a definition of the limits of the invention.

What is claimed is:

1. In a hydraulic damping coupling, a driving shaft, a driven shaft, said shafts being in end-to-end relation, a housing embracing the ends of said shafts, said shafts having radial relatively rotatable vanes within said housing defining with said housing a chamber variable in volume in accordance with the position relation of said vanes, one vane being driven by said driving shaft toward the other vane, the latter vane driving the driven shaft and being fixed for rotation with said housing, a pump driven by one of said shafts, means for delivering all of the fluid from said pump into said vane and housing defined chamber, a discharge port in said housing, and means comprising one of said vanes sweeping over said port for varying the area of said port in response to relative movement between said vanes.

2. In a hydraulic damping coupling, a driving shaft, a gear pump having mating gears one of which is affixed to said shaft, a cylindrical barrel concentric with the axis of the other of said gears, two sets of radial vanes within said barrel, one set of said vanes being driven by said other gear, the other set of vanes being drivably connected to a driven shaft, said sets of vanes being relatively movable with respect to one another to define with and within said barrel a chamber variable in volume accordingly as said vanes change their position relation, said barrel being affixed for rotation with one of said sets of vanes and having circumferential discharge ports in the wall thereof closable in part, at times, by vanes of the other set as they move along the wall, the discharge area of said ports being varied in response to the relative movement between the vanes, and means for delivering all fluid delivered by the gear pump to said chamber.

CHARLES W. CHILLSON.

REFERENCES CITED

The following references are of record in the file of this patent:

UNITED STATES PATENTS

| Number | Name | Date |
| --- | --- | --- |
| 1,062,876 | Blymyer | May 27, 1913 |
| 1,477,170 | Goode | Dec. 11, 1923 |
| 1,660,300 | McGee et al. | Feb. 21, 1928 |
| 1,685,839 | DuBois | Oct. 2, 1928 |
| 1,904,284 | Fagan et al. | Apr. 18, 1933 |
| 2,224,884 | Schneider et al. | Dec. 17, 1940 |
| 2,277,270 | Schmitter et al. | Mar. 24, 1942 |
| 2,305,439 | Miller | Dec. 15, 1942 |
| 2,307,506 | Huntington | Jan. 5, 1943 |
| 2,436,669 | Rausenberger | Feb. 24, 1948 |